Figure 1:
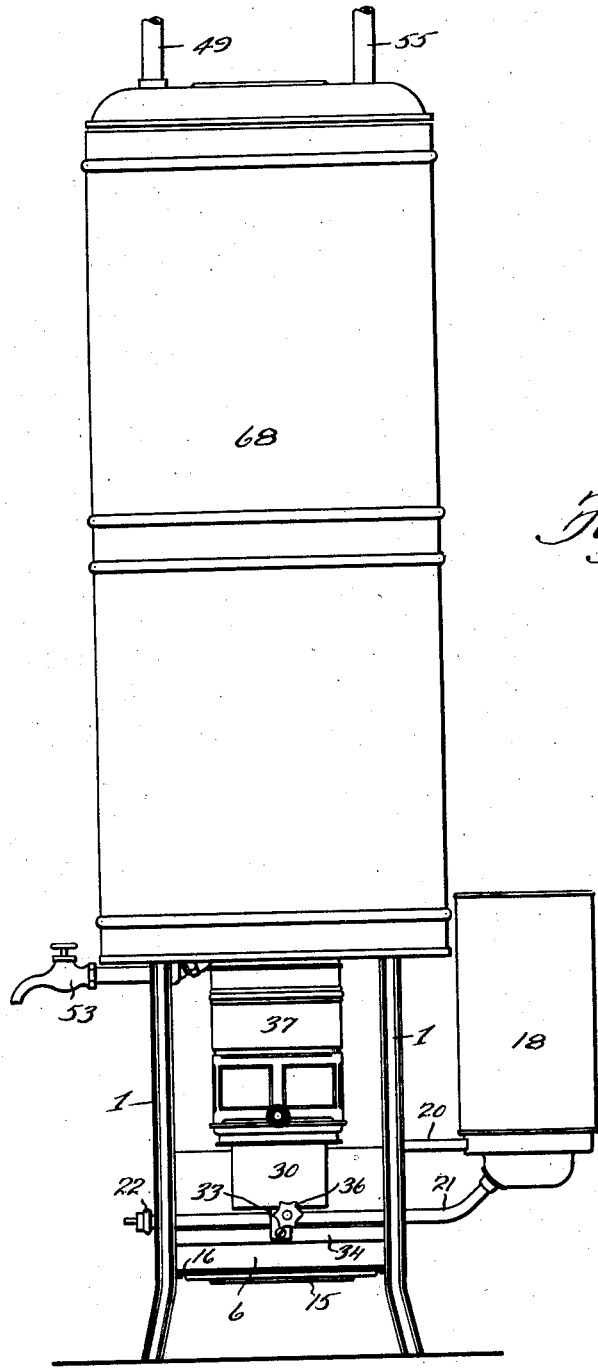

Dec. 17, 1929.  L. S. CHADWICK ET AL  1,740,068
WATER HEATING AND STORAGE APPARATUS
Filed Sept. 26, 1923  6 Sheets-Sheet 1

Inventors
Lee S. Chadwick
Marc Reack
By Hull, Brock & West
Attys.

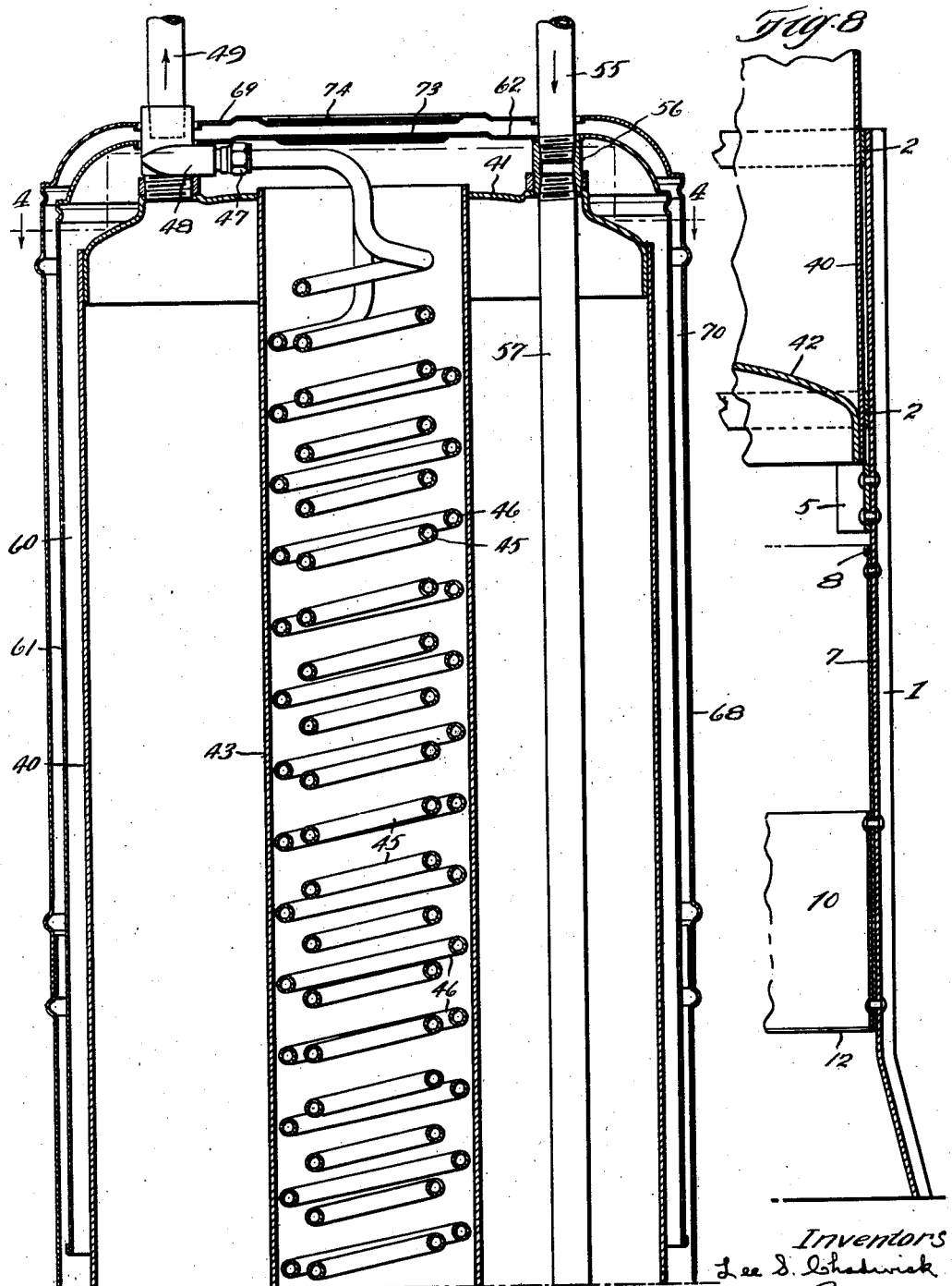

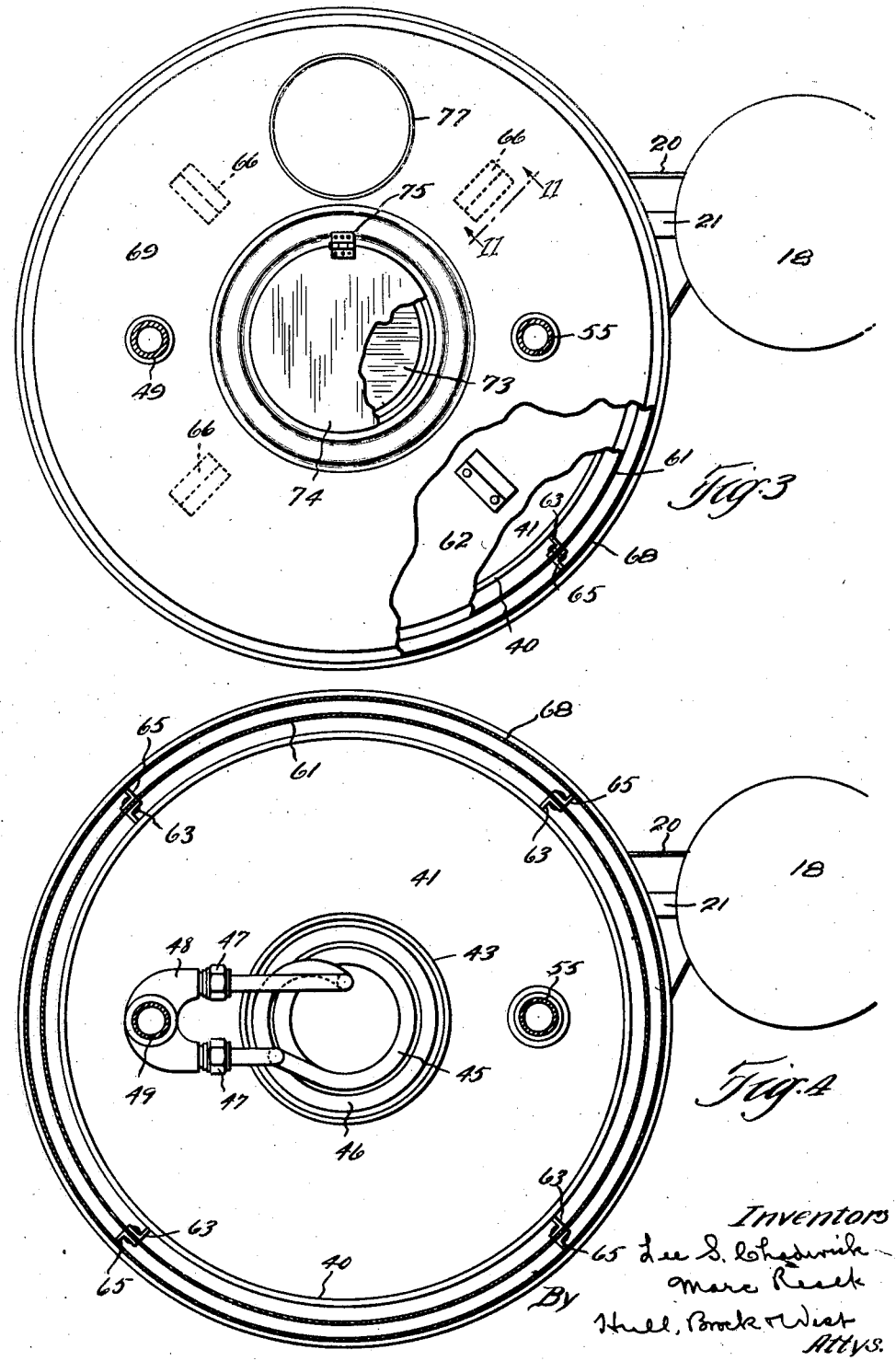

Dec. 17, 1929.   L. S. CHADWICK ET AL   1,740,068
WATER HEATING AND STORAGE APPARATUS
Filed Sept. 26, 1923   6 Sheets-Sheet 5

Inventors
Lee S. Chadwick
Marc Resek
By Hull, Brock & West
Attys

Dec. 17, 1929.   L. S. CHADWICK ET AL   1,740,068
WATER HEATING AND STORAGE APPARATUS
Filed Sept. 26, 1923    6 Sheets-Sheet 6
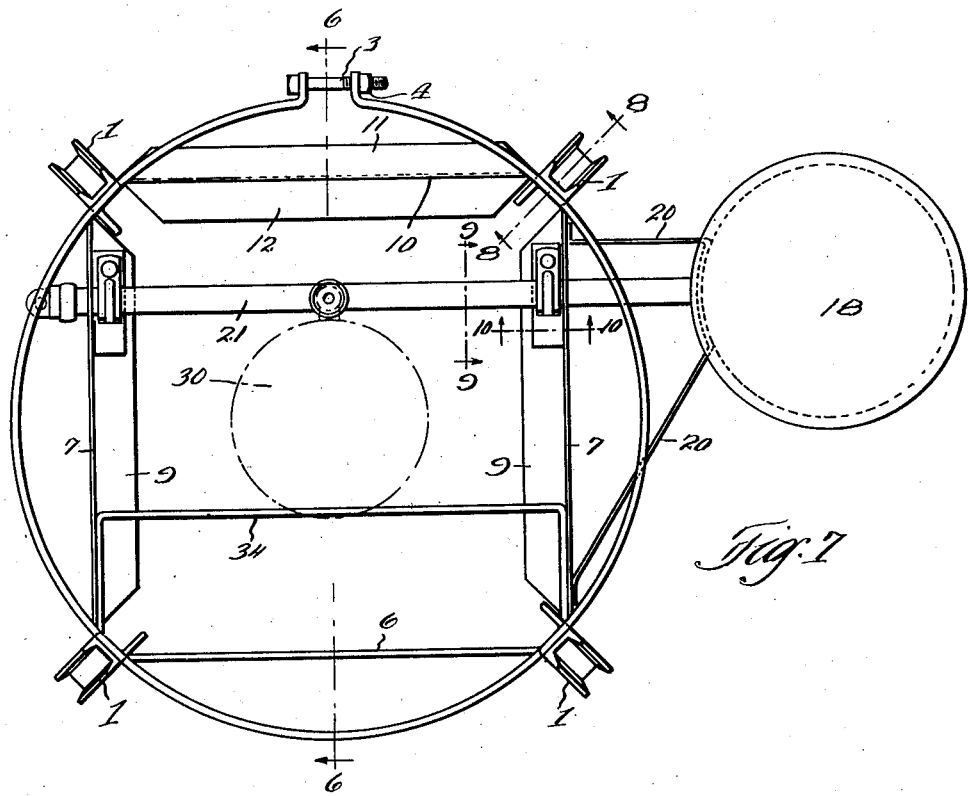
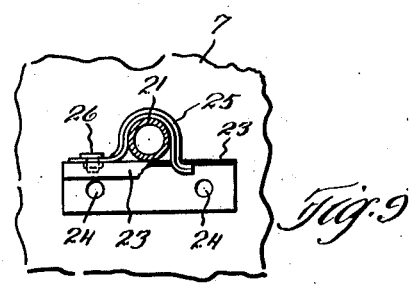
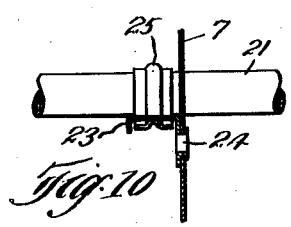
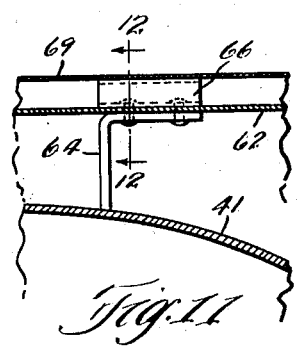
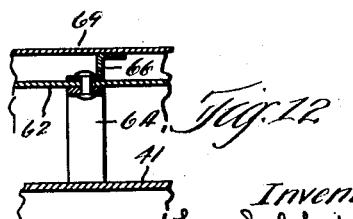
Inventors
Lee S. Chadwick
Marc Resek
By Hull, Brock & West
Attys.

Patented Dec. 17, 1929

1,740,068

UNITED STATES PATENT OFFICE

LEE S. CHADWICK, OF SHAKER HEIGHTS VILLAGE, AND MARC RESEK, OF EAST CLEVELAND, OHIO, ASSIGNORS TO PERFECTION STOVE COMPANY, OF CLEVELAND, OHIO, A CORPORATION OF OHIO

WATER HEATING AND STORAGE APPARATUS

Application filed September 26, 1923. Serial No. 664,850.

This invention relates to water heaters and more particularly to one combining the principles of the storage and circulating types, and its primary purpose is to provide a construction that is peculiarly suited to the use of liquid fuel burners, of the kind wherein wicks are employed, as the heating means.

Burners of the kind referred to have a capacity to heat a relatively large volume of air but not to so high a degree of temperature as gas burners, for example, which are customarily used with water heaters of the class to which our invention relates; and it is manifestly more difficult to construct an efficient water heater for liquid fuel burners than for gas burners because the products of combustion are of a lower temperature though of greater volume.

What we have in view is the production of a water heater of very high thermal efficiency—that is to say, one which effects an exchange of temperature between the products of combustion and the water with the minimum loss of heat—and which conserves fuel by maintaining a portion of the body of water within the storage compartment from which the hot water is drawn off at a high temperature by the use of a comparatively low fire, or by maintaining the water at a relatively high degree of temperature for a considerable length of time after the operation of the burner is suspended.

The high thermal efficiency of the apparatus results from the manner in which the very hot products of combustion are brought directly into contact with a water circulating unit or conduit having a thin wall of high thermal conductivity, the products thereafter being entrained about the storage compartment to further heat the water in said compartment and to prevent radiation of heat therefrom; and the conservation of fuel is due to the facts that, first, with a comparatively low fire the temperature of the water in that portion of the storage compartment from which the hot water is drawn may be maintained at a relatively high degree, and, second, when the burner is turned out, a body of inert air, which remains warm for a considerable period of time, is trapped about the water circulating and storage compartments preventing radiation of heat therefrom and protecting the storage compartment from the cooling influence of the surrounding air.

A further object of the invention is to provide a so-called self-contained water heating apparatus that is substantial of construction, is very compact, convenient of installation, designed to facilitate cleaning, and is effectively insulated by air jackets avoiding the use of asbestos, mineral wool, or other similar insulating materials which deteriorate, absorb moisture and thus contribute to the rusting out of the tanks and sheet metal jackets, the absence of the insulating material making the apparatus cleaner and more sanitary.

Figure 2A:
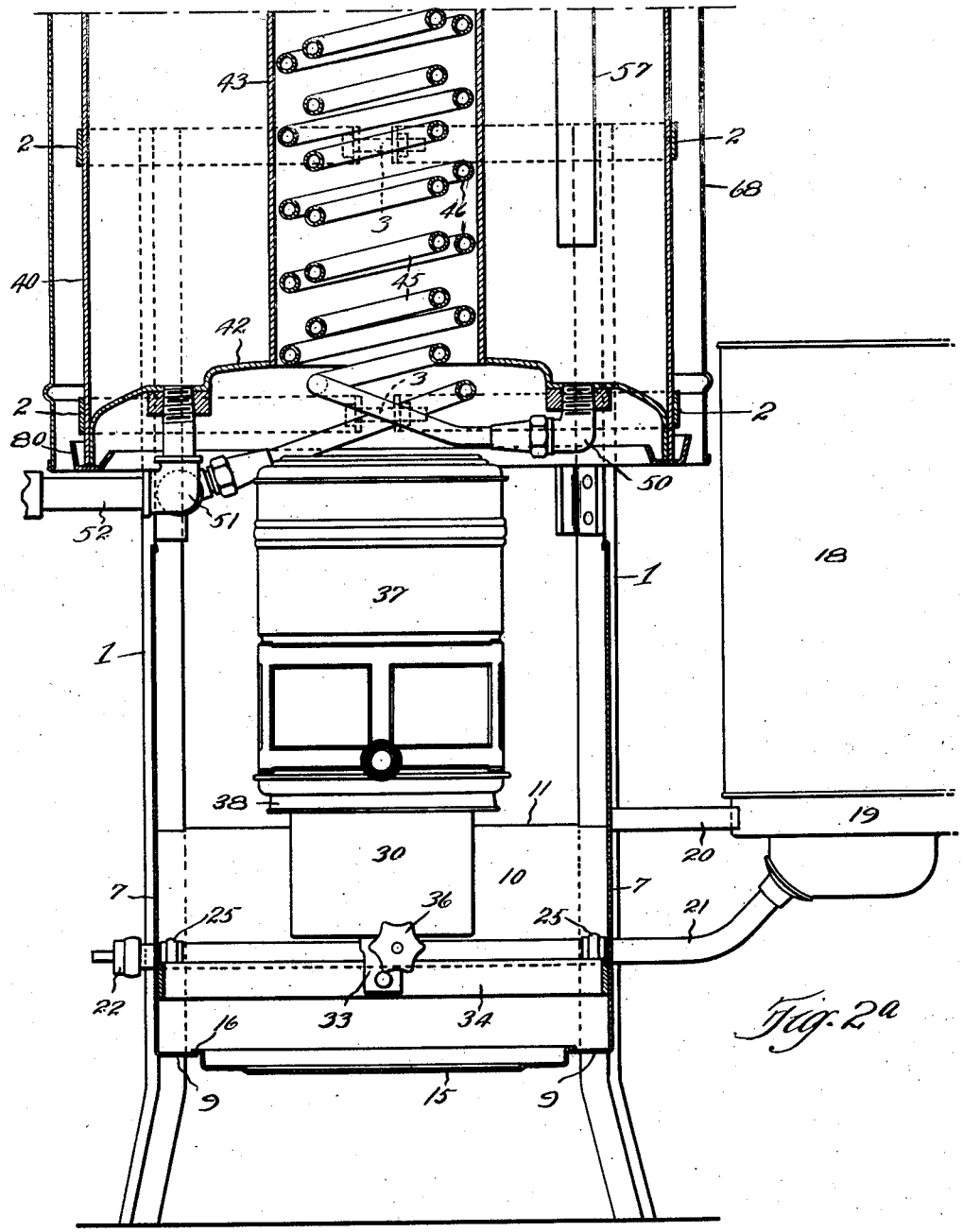
Figure 5:
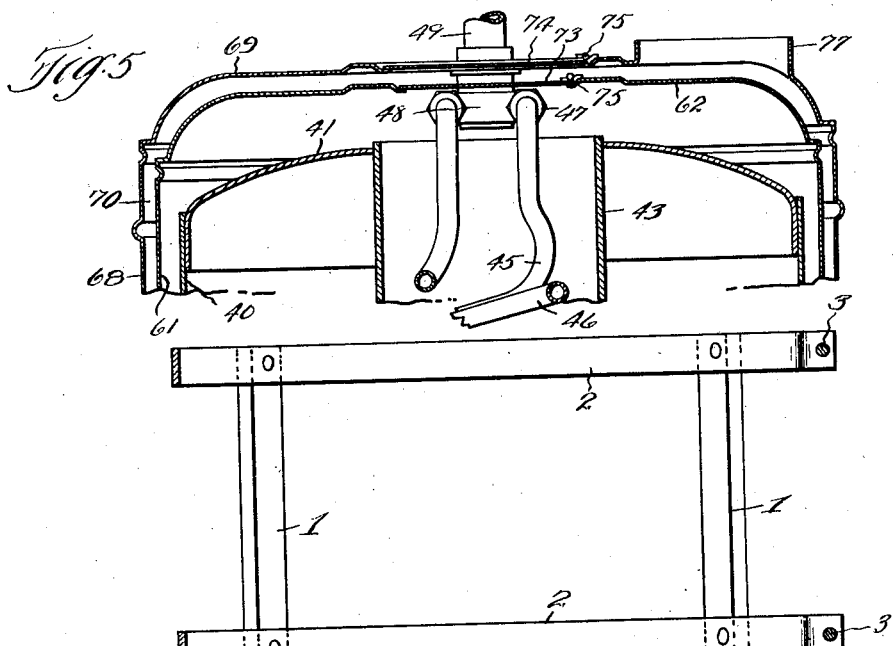
Figure 6:
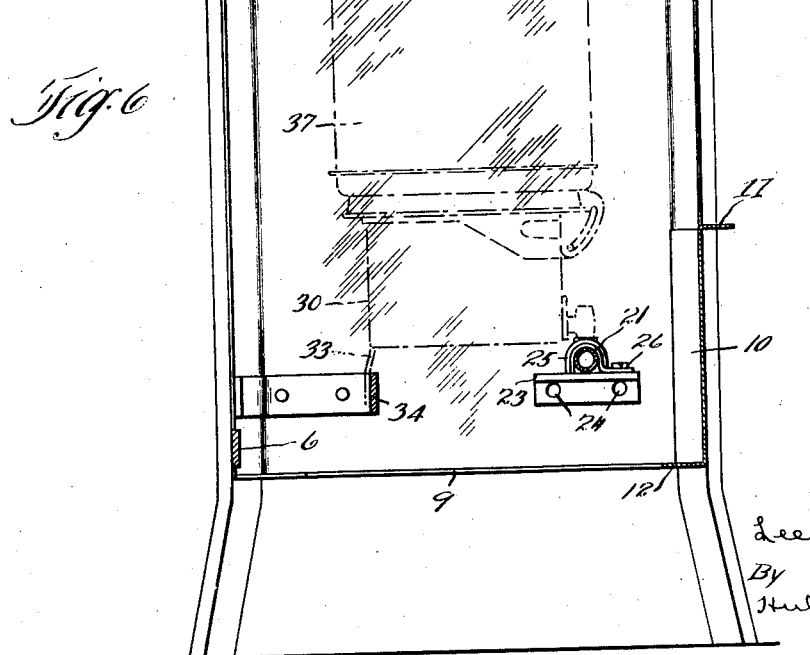

The foregoing objects, with others hereinafter appearing, are attained in the structure illustrated in the accompanying drawings wherein Fig. 1 is a front elevation of our improved water heater; Figs. 2 and 2ª constitute a central vertical section of the apparatus, on a considerably enlarged scale, the plane of section being parallel to the plane of Fig. 1; Fig. 3 is a plan view of the apparatus with parts broken away to reveal structural details; Fig. 4 is a horizontal section substantially on the line 4—4 of Fig. 2; Fig. 5 is a fragmentary central vertical section through the tank and jackets at right angles to the plane of Fig. 2; Fig. 6 is a vertical section on line 6—6, Figure 7, through the stand at right angles to the plane of Fig. 2ª and in the same plane as Fig. 5; Fig. 7 is a plan of the stand; Fig. 8 (Sheet 2) is a vertical section on the line 8—8 of Fig. 7 and includes a portion of the tank and outer jacket; Figs. 9 and 10 are sectional details on the respective lines 9—9 and 10—10 of Fig. 7; Fig. 11 is a sectional detail on the correspondingly numbered line of Fig. 3; and Fig. 12 is a section on the line 12—12 of Fig. 11.

The apparatus is made up of three major parts, a stand incorporating a burner and fuel reservoir; a water circulating and storage unit; and inner and outer jackets which encase said unit, and we shall now proceed to describe the foregoing parts in the order named.

The stand comprises four legs 1 which have their upper ends connected together by contractible hoops 2, the separated ends of each of the hoops being adjustably connected together through bolts 3 equipped with nuts 4. Ledges 5 project inwardly from the legs 1 a suitable distance below the lower hoop 2. The front legs of the stand are tied together near their lower ends by a bar 6, and the legs on each side of the stand are connected together through sheet metal side panels 7 which have their upper ends turned inwardly and over, as shown at 8, and their lower edges directed inwardly to form horizontal flanges 9. A relatively short back panel 10 connects the rear legs, and it is provided at its upper end with a rearwardly directed flange 11 and at its lower edge with a forwardly directed flange 12. A drip pan 15 (Figs. 1 and 2ª) is adapted to be removably supported through its flared edges 16 from the flanges 9 and 12.

A fuel reservoir 18 of approved type is adapted to be inverted over and supported by a distributing receptacle 19 that is rigidly secured to the stand through a bracket 20 that is fastened to the adjacent side panel 7 and through the fuel supply pipe 21 which leads from the lower portion of the receptacle 19 through holes in the side panels 7, the end of the supply pipe remote from the receptacle 19 being closed by a cap 22. Immediately below the apertures of the side panels through which the pipe 21 extends are ledges 23 that are shown as connected to the panels by eyelet extensions 24 (Figs. 6, 9 and 10). Pipe clamps 25 embrace the pipe and have one of their ends projected through slots in the ledges and their other ends connected to the ledges by screws 26.

A liquid fuel burner 30 has communicative connection with the pipe 21 and is supported by said pipe at its rear side, and at its front is supoprted through a leg 33 from a cross member 34 which has its end portions directed forwardly along the inner sides of the panels 7 and connected to the front legs of the stand. While the burner may be of any approved type sufficiently powerful for the purpose, we prefer at the present time to employ what is known as a giant burner similar to that described in detail in the co-pending application of Marc Resek and Charles J. Kessler, Serial No. 598,932, filed November 3, 1922. The burner is equipped with the usual wick raising spindle having an operating handle 36 disposed toward the front of the stand where it may be conveniently manipulated. A drum 37 is sustained, through a collar 38, in operative relation to the burner 30 and may be tilted rearwardly to gain access to the upper end of the wick for lighting, cleaning and replacing purposes. The nature of the connection between the drum and burner is disclosed in the co-pending application of Lee S. Chadwick, Serial No. 539,079, filed February 25, 1922. The rearwardly directed flange 11 of the rear panel 10 serves as a support for the drum 37 when the latter is tilted.

The water circulating and storage unit comprises a cylindrical tank 40 having annular top and bottom walls 41 and 42, respectively, and a central flue 43 connects the top and bottom walls. This construction, therefore, provides an annular water storage compartment. The circulating element of the unit is made up of inner and outer helical coils 45 and 46, respectively, that are disposed within the flue 43 and have their upper ends connected through unions 47 with a branched fitting 48 which has communicative connection with the upper end of the storage compartment. An outlet pipe 49 leads from the fitting 48. At their lower ends, the coils 45 and 46 are led to opposite sides of the tank and are communicatively connected therewith through suitable fittings designated 50 and 51, the latter having a branch 52 to which a faucet 53 is applied and which is provided essentially for draining the tank. An inlet pipe 55 is connected, through a nipple 56, with the top of the tank, and an extension 57 of said pipe leads downwardly to a point adjacent the lower end of the tank so as to deliver the cold water to the bottom of the tank in accordance with the usual practice.

The tank 40 is of a diameter to fit within the hoops 2, and its lower end is adapted to rest upon the ledges 5. By tightening the nuts 4 the ends of the respective hoops 2 may be drawn together through the bolts 3 to firmly clamp the tank to the stand.

An inner jacket 60, comprising a cylindrical wall 61 and a circular wall 62, encases the upper portion of the storage tank and is maintained in substantially concentric spaced relation to the cylindrical wall of the tank by spacers 63, and in vertical spaced relation to the tank by spacers 64, each of the spacers being formed of channel members which have one of their respective branches connected to the adjacent wall of the jacket by rivets which pass through said wall and serve to connect other spacers 65 and 66 to said walls. The latter spacers engage, respectively, the cylindrical wall 68 and the top circular wall 69 of an outer jacket 70 and space said outer jacket from the inner jacket. The cylindrical wall 68 of the outer jacket extends to the bottom of the corresponding wall of the tank and is located outside of the upper end portions of the legs 1 and conceals the hoops 2. The top walls 62 and 69 of the inner and outer jackets, respectively, have central openings that are substantially in axial alignment with the flue 43 and said openings are normally closed by the respective doors 73 and 74, shown as connected through hinges 75 to said walls. The door 73 of the inner jacket is preferably somewhat smaller than that of the outer jacket so that upon opening the outer door, the inner one may be opened wide through it. These doors are provided particularly for the purpose of affording access to the flue 43 and coils 45 and 46 so that a suitable brush may be inserted downwardly through the tops of the flue and coils for cleaning. The top wall 69 of the outer jacket is shown as provided with an outlet opening surrounded by a flue collar 77 which may have connection with a flue.

When installed, water enters through the pipe 55 and may be drawn out through the pipe 49. With the burner lighted, the hot products of combustion rise through the flue 43 in intimate contact with the coils 45 and 46 and upon reaching the top of the tank spread and flow down through the space between the inner jacket and the tank, about the lower edge of the inner jacket and upwardly between the inner and outer jackets and escape through the outlet opening 76 of the top wall. By providing this prolonged and somewhat tortuous passageway for the products of combustion they are caused to give up practically their entire heat, and in the first inistance, a large portion of the heat is transmitted through the comparatively thin walls of the tubes 45 and 46 to the water that is present within said tubes, a part is transmitted to the water within the tank through the wall 43, while that remaining, as the products pass over the tank and fill the inner jacket, tends to raise the temperature of the water within the upper portion of the tank and effectively protects it against the cooling influence of any air passing upwardly through the space between the inner and outer jackets. While on this point it may be explained that during the operation of the apparatus there may be a slight upward current of fresh air through the space between the outer jacket and tank induced by the natural flow of the warm air between the inner and outer jackets, the fresh air entering the opening between the lower ends of the outer jacket and tank, but this is of little consequence as it has no appreciable effect one way or the other upon the efficiency of the apparatus; but the aforesaid opening between the lower ends of the outer jacket and tank becomes important when the apparatus is connected to a flue because in such an installation the draft of the flue is satisfied by the fresh air entering said opening and leaves undisturbed the warm air in the space between the inner jacket and the tank as well as that within the central flue 43.

It follows from what has just been said that when the burner is turned out the warm air within the flue 43 and that within the space between the inner jacket and the tank becomes inert on account of no more hot air being discharged into said space, and this dead air, so to speak, envelops the upper portion of the tank and insulates it from the cooler surrounding air and maintains the water within said portion of the tank at a relatively high degree of temperature for a considerable length of time.

Another situation in which the opening between the lower ends of the outer jacket and tank figures with some degree of importance is one involving the dished or concaved bottom wall 42 of the storage tank and its relation to the upper or discharge end of the burner drum 37. It will be observed, especially from Fig. 2ª, that the top of the burner drum is slightly above the plane of the outer edge of the bottom wall 42. Consequently the dished or concaved bottom wall of the tank serves to concentrate the products of combustion issuing from the burner flue, and the air heated by radiation which rises about the burner or between the burner and the side panels 17 and conducts them to the central flue 43. Any warm air escaping about the edge of the bottom wall of the tank is recovered by the outer jacket and conducted upwardly through the space between said jacket and the tank and imparts heat to the tank wall. This arrangement contributes materially to the efficiency of the apparatus.

Attention is also directed to the fact that the coils 45 and 46, arranged as they are, serve as baffles for the products of combustion, yet being spiral and advancing in the same direction, they impart a swirling action to the products and this action tends to restrict the products to the vicinity of the coils and of wall of the flue 43 and prolong their travel through the flue without actually retarding their rate of flow.

In the operation of the apparatus condensation to a limited degree occurs in the region of the upper ends of the tank and flue 43, and the condensate, flowing down the tank wall and down the flue and across the underside of the bottom wall 42, is caught in an annular trough 80 wherein the lower end of the tank rests. A drain may be provided if desired, but so far it has been found unnecessary as the very small amount of water that collects in the trough quickly evaporates. The trough prevents the condensate from running down and streaking the lower parts of the apparatus or from making a moist ring on the floor.

Having thus described our invention, what we claim is:

1. In apparatus of the character set forth, the combination of a tank, a stand supporting said tank and from which the tank is removable, said stand comprising legs between the upper ends of which the tank is received, the legs having ledges whereon the tank rests, contractible hoops surrounding the tank and connecting together and spacing apart said legs, means for contracting said hoops to clamp the tank to the stand, and a jacket extending over and removably sustained by the tank and depending about and concealing the upper ends of the legs and said hoops.

2. In apparatus of the character set forth, the combination of a tank having a central vertical flue, a stand supporting said tank and comprising legs between the upper ends of which the tank is received, the legs having ledges whereon the tank rests, hoops surrounding the tank and connecting together and spacing apart said legs, a burner sustained by the stand in operative relation to the tank, a jacket extending over the tank and depending about and concealing the upper ends of the legs and said hoops, and a second jacket inside the first jacket and encasing the upper end of the tank, said second jacket terminating at its lower end above the upper ends of the legs, the first mentioned jacket having an outlet opening at its upper end.

3. In apparatus of the character set forth, the combination of a cylindrical tank having a central vertical flue, an inlet pipe leading through the top wall of the tank to adjacent the lower end of the tank, an outlet pipe leading from the top of the tank, a circulating coil disposed within the flue and having its lower end communicatively connected with the tank and its upper end similarly connected with the outlet pipe, a stand supporting the tank and incorporating a liquid fuel burner and a fuel supply reservoir therefor, an inner jacket encasing the upper end of the tank and extending part way down about the same, and an outer jacket surrounding the inner jacket and extending to a point adjacent the lower end of the tank, the space between the outer jacket and the tank being open at its lower end, the top of the outer jacket having an outlet opening.

4. In apparatus of the character set forth, the combination of a tank having a vertical flue, a burner in operative relation to the tank, a jacket extending over the tank and depending to the lower end thereof, and a second jacket inside and spaced from the first jacket and terminating at its lower end above the corresponding end of the first jacket and encasing the upper end of and spaced from the tank, said second jacket being closed at its upper end while the first mentioned jacket is provided with an inlet opening at its lower end and an outlet opening at its upper end.

5. In apparatus of the character set forth, the combination of a tank having a flue extending through it from top to bottom, an inner jacket enclosing and spaced from the upper portion of the tank, an outer jacket enclosing the inner jacket and tank and spaced therefrom and extending to the lower end of the tank, the outer jacket being open at its lower end for the admission of air, said jackets having openings in register with the flue of the tank, and closures for said openings.

6. In apparatus of the character set forth, the combination of a tank having a concaved lower end and a flue extending through the tank from top to bottom, an inner jacket enclosing and spaced from the top of the tank and extending downwardly along the side walls thereof and terminating short of the bottom of the tank, said jacket having a closed top, an outer jacket enclosing the inner jacket and the tank and spaced therefrom and extending to the bottom of the tank, the outer jacket having a vent at its upper end and being open at its lower end to the admission of air, and a liquid fuel burner arranged beneath the concaved bottom of the tank, said burner involving a flue which projects into said concaved bottom.

In testimony whereof, we hereunto affix our signatures.

LEE S. CHADWICK.
MARC RESEK.